Aug. 14, 1956  T. G. HARE  2,758,690
CENTRIFUGAL FRICTION CLUTCH WITH CHAIN ACTUATOR
Filed Dec. 28, 1950  2 Sheets-Sheet 1

INVENTOR.
Terence G. Hare.
BY Frank C. Learman.
ATTORNEY

Aug. 14, 1956 T. G. HARE 2,758,690
CENTRIFUGAL FRICTION CLUTCH WITH CHAIN ACTUATOR
Filed Dec. 28, 1950 2 Sheets-Sheet 2

INVENTOR.
Terence G. Hare.
BY
Frank C. Scarman,
ATTORNEY

United States Patent Office 2,758,690
Patented Aug. 14, 1956

2,758,690

CENTRIFUGAL FRICTION CLUTCH WITH CHAIN ACTUATOR

Terence G. Hare, Detroit, Mich.

Application December 28, 1950, Serial No. 203,051

26 Claims. (Cl. 192—105)

The present invention relates to an automatic clutch, and more particularly to a centrifugal friction type clutch for drivingly connecting two relatively rotatable members when one of the members is driven at a predetermined speed or attains a preselected angular velocity.

One object of the invention is to provide a centrifugal friction type clutch in which a friction element is moved into frictional engagement with a clutch drum by centrifugal force developed by a segmental link type roller chain which is arranged to initially urge the friction element into engagement with a friction drum. The alternate chain link pins are connected by control limit links to maintain the links in toggle arrangement and to return the chain evenly throughout its length when moved to its disengaged position.

Another object is to provide a centrifugal friction type clutch in which the roller chain links are held in staggered zig-zag relation by means of limit links connecting alternate link pins, and to provide slotted connections at one end of said limit links to enable expansion and contraction when the roller link chain is moved to force the friction element into and out of engagement with the clutch drum.

Another object is to provide an automatic centrifugal friction type clutch having an actuator formed of a link roller chain arranged so that the rollers of alternate links engage the inner and outer periphery of the relatively rotatable driving and driven clutch members, thereby enabling the roller chain actuator to exert outward pressure on the friction clutch element during the initial centrifugal action which causes further buckling of the roller link chain to exert a self-energizing action and an additional radial force to the friction clutch element.

Another object is to provide an automatic centrifugal friction type clutch having a roller link chain actuator which has its trailing end connected to the drive member, and its opposite end connected to a friction clutch element including a split ring having its ends yieldingly connected in such a manner that the roller chain links will be partially compressed when the drive is arrested and thereby exert a compressive force on alternate chain links tending to straighten them from their zig-zag position within the limits of the limit or control links.

Another object is to provide an automatic centrifugal friction type clutch in which the roller chain link actuator is composed of a series of inner and outer chain links connected together by link pins having rollers thereon for holding the links in spaced relation with certain alternate rollers omitted for accommodating the limit links which normally maintain the roller chain links in toggle fashion or circumferential zig-zag staggered relation.

Another object is to provide an automatic centrifugal friction type clutch having a roller link chain with alternate link pins connected by additional limit links with a pin and slot connection therebetween which is intended to enable the link chain to return to its normal position evenly throughout its length when the clutch elements are in a disengaged position.

Another object is to provide an automatic centrifugal friction type clutch in which the alternate link pins are connected by limit links having a pin and slot connection at one end arranged to permit the chain links to move in a zig-zag fashion circumferentially and evenly to produce a toggle action when a torque force is applied to the trailing end of the link chain by the clutch drive member.

Another object is to provide an automatic centrifugal friction type clutch having a roller link chain actuator, the links of which are held in a staggered zig-zag fashion circumferentially so that when a torque force is applied to the trailing end of the link chain the rollers mounted between the inner and outer links will exert a radial force on the friction clutch element and thereby urge the same into tight frictional engagement with the outer clutch element.

Another object is to provide an automatic centrifugal friction type clutch including a roller link chain having alternate link pins connected by limit links arranged so that when the outer clutch element over-runs the inner clutch element when the driving torque is released, the roller link chain will have a propensity to flatten out so that alternate rollers will be compressed inwardly by the yielding split clutch band.

Other objects and advantages of the invention will become apparent during the course of the following description of the accompanying drawing wherein.

Figure 1:
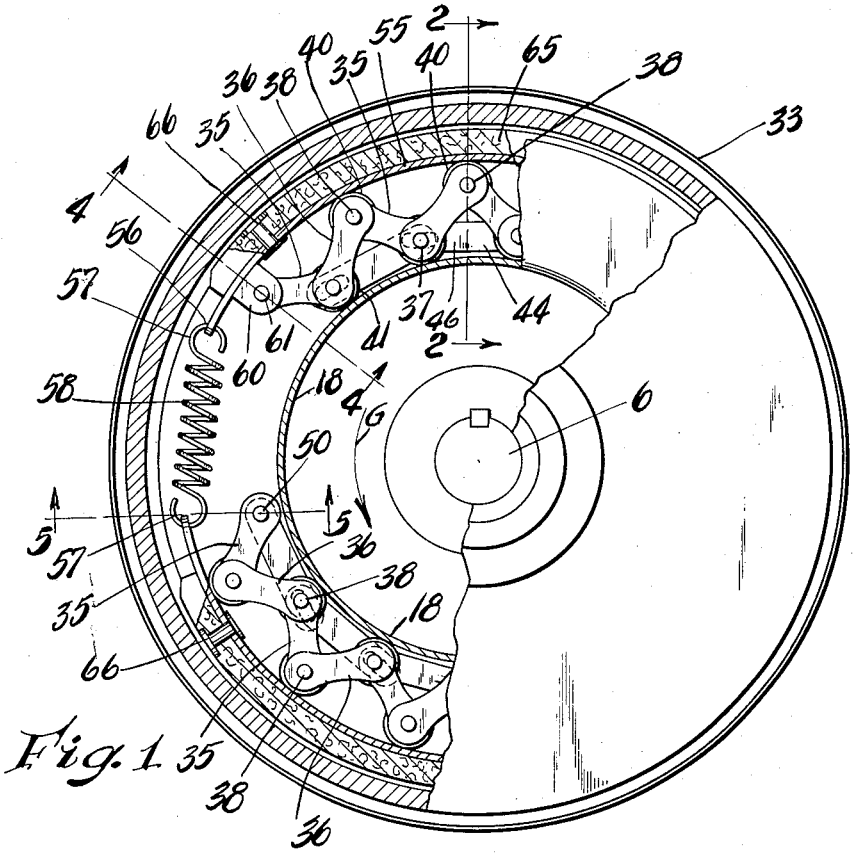
Figure 1 is a side elevational view of the automatic centrifugal friction type clutch showing portions thereof broken away and in section to illustrate the manner in which the roller link chain is arranged in a channel way with the links extending in a zig-zag toggle fashion.
Figure 4:
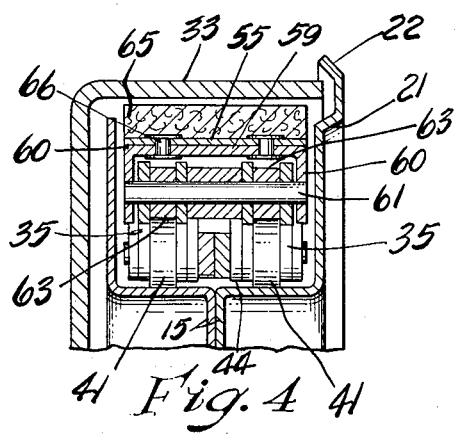
Figure 5:
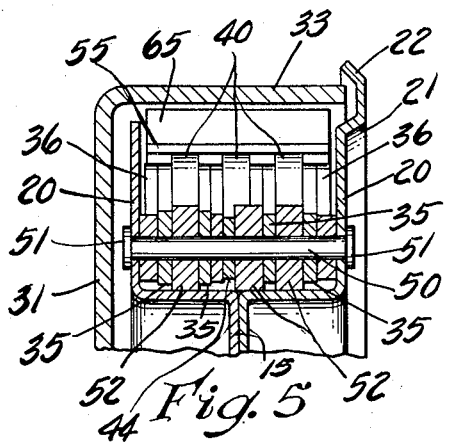

Figure 4 is a fragmentary radial cross-sectional view taken on line 4—4 of Figure 1 and looking in the direction of the arrows to illustrate the manner in which the leading end of the roller link chain is connected to one end of a split friction clutch element, and Figure 5 is a fragmentary radial cross-sectional view taken on the radial line 5—5 of Figure 1 and looking in the direction of the arrows to illustrate the manner in which the trailing end of the roller link chain actuator is connected to the inner clutch member.

In the drawings, and more in detail, there is shown for the purpose of convenience of illustration a portion of an electric motor generally designated 5 having an armature shaft 6 which is adapted to supply power to a domestic or industrial appliance. Obviously, an internal combustion engine can be used as the driver for the internal clutch assembly generally designated 7 for imparting power to the external clutch member likewise generally designated 8. The external clutch member 8 can be drivingly connected to various domestic and industrial appliances and devices where it is desired to transmit rotary motion from the power unit to the appliance or device.

Mounted on the motor shaft 6 is the hub 9 of the internal clutch member 7, and said hub is provided with a keyway 10 which is adapted to register with a splined portion 11 of the shaft 6 for receiving a spline key 12. The hub 9 is provided with an internal radial bore 13 having threads for receiving a correspondingly threaded locking screw 14 adapted to engage the spline key 12 and lock the hub in place against endwise movement.

The internal clutch member 7 includes a pair of complementary disks 15 having a central opening of sufficient diameter to be received on the reduced portion 16 of the hub 9. The disks 15 are held in tight clamping engagement with an inner shoulder on the hub by means of upsetting the metal adjacent one end of the hub so that the same will form a flange and clampingly engage the inner peripheral portions of the disks 15 adjacent the central opening.

The rim portions of the disks 15 are bent outwardly to form cylindrical oppositely extending portions 18, and the rim sections are further bent as at 19 to form radial walls 20 to provide therebetween an annular channel for receiving the actuator and split friction clutch band which will be presently described. One of the radial walls 20 has its peripheral edge bent to form an offset 21 which terminates in an obliquely extending annular bead or rib portion 22 forming a dust shield for the clutch.

Rotatably mounted on the shaft 6 is the hub 23 of the external clutch member 8, and said hub is provided with a central opening 24 having a bronze bearing liner 25 to reduce friction and wear between the hub 23 and its supporting shaft 6. The outer end of the shaft 6 is provided with an inwardly extending internally threaded bore 26 for receiving a machine screw 27 which is adapted to retain a thrust washer 28 in position with one of its radial walls in bearing engagement with one end of the external clutch member hub 23.

The inner end of the hub 23 is provided with an annular enlarged portion 29 having an annular recess 30 to accommodate the inner edge portion of wall 31 of the external clutch member 8. The peripheral portion of the radial wall 31 is bent as at 32 to form a rim section 33 which has its end terminating a distance short of the offset portion 21 of the internal clutch member wall 20. Thus, the rim section 33 provides an external clutch drum which is adapted to rotate independently of the internal clutch member until the inner clutch member actuating mechanism attains a predetermined speed to directly connect the internal and external clutch members in a manner to be presently described.

Mounted in the annular channel in the peripheral portion of the internal clutch member 7 and between the radial walls 20 thereof is a link chain actuator consisting of a plurality of sets of inner and outer chain links 35 and 36 having enlarged end portions which are arranged in interdigitating relation and are pivotally connected by inner and outer link pins 37 and 38. It is to be noted, that the link chain formed by the links 35—36 is crowded into the annular channel of the internal clutch member 7 so that the links 36 will extend tangentially in one direction, while the links 35 will extend tangentially in an opposite direction, thus positioning the links 35—36 in a zig-zag fashion circumferentially within the channel of the internal clutch member 7.

Figure 2:
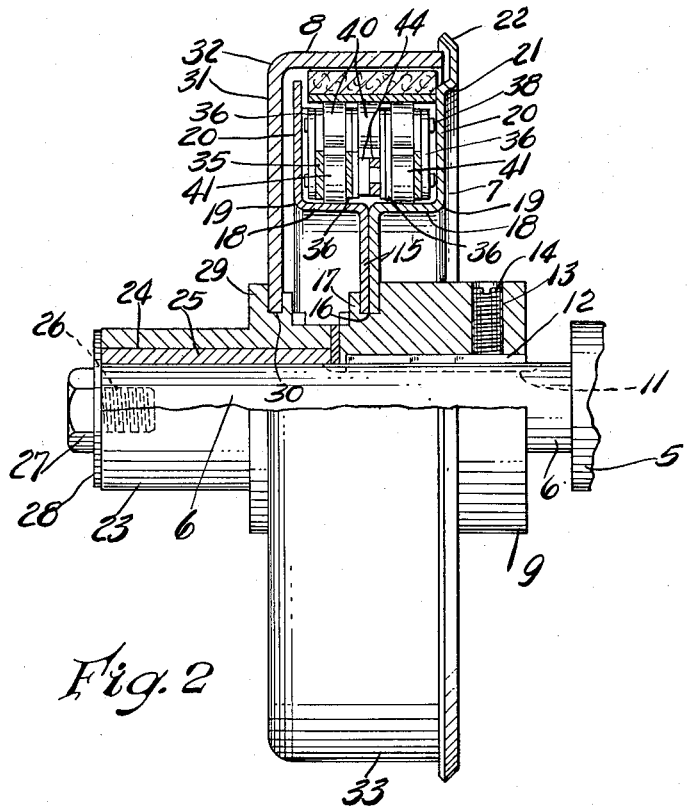
Figure 2 is a front elevational view showing a portion thereof in section on line 2—2 of Figure 1, and looking in the direction of the arrows to illustrate the link chain assembly and the manner in which certain rollers thereof are eliminated for accommodating the limit links.

Mounted on the link pins 38 between the ends of the sets of inner and outer chain links 35—36 is a series of rollers 40 which hold the sets of links in spaced-apart relation (see Fig. 2). The inner link pins 37 are provided with spaced rollers 41 to provide a central space between the inner ends of chain links 35—36. In other words, each of the link pins 37 is provided with rollers 41 between adjacent sets of chain links at the opposite ends of the link pins.

The space between the intermediate sets of inner and outer chain links 35—36 on the pins 37 is adapted to accommodate limit links 44 which are provided at one end with an opening 45 for receiving certain link pins 37. The opposite ends of the limit links 44 are slotted as at 46 and are received on alternate link pins 37 in such a manner as to retain the chain links in a zig-zag toggle fashion, but yet permitting movement of adjacent sets of inner and outer links within the limits of the elongated slots 46 in the limit links 44 as shown in Figure 3.

Figure 3:
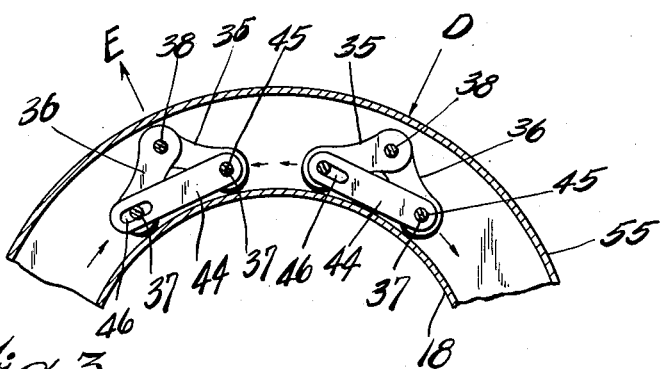
Figure 3 is a fragmentary diagrammatic view illustrating the relative positions of certain roller chain links during their clutch engaging and releasing positions.

In Figure 3 the radial line and arrow D indicates the inner and outer links 35—36 in their contracted position, which is the position they assume when the driving force of the internal clutch member is not applied thereto. In the other position indicated by the radial line and arrow E displaced an angular distance of approximately 45 degrees from the radial line and arrow D, the inner and outer links 35—36 are shown in a position in which driving force is applied to the trailing end of the link chain to cause the links to expand in the annular channelway and exert radial pressure in a direction outward toward the external clutch member or drum 33.

It is to be noted that the limit links 44 are arranged on the inner link pins with adjacent ends in side by side overlapping relation (see Figs. 2, 4 and 5), to form a continuous chain. The limit links 44 above described, control the outer links 35 and 36 so that the consecutive pairs of links making up the chain move progressively, radially and circumferentially throughout the length of the chain during the declutching movement.

One end of the roller link chain formed by the inner and outer links 35—36 is connected to the radial walls 20 of the internal clutch member 7 by means of a pin 50 which extends through the link pin openings in the series of inner links 35. The ends of the anchor pin 50 are upset as at 51 after being passed through alined openings in the radial walls 20 (see Fig. 5). Mounted on the anchor pin 50 between the sets of spaced inner links 35 is a series of spacing rollers 52 (see Fig. 5) which merely hold the free ends of the inner links 35 in spaced-apart side by side relation.

Mounted between the roller link chain and the inner periphery of the external clutch drum 33 is a flexible metal band 55 which is of a width to be slidably received between the radial walls 20 of the internal clutch member 7. The free ends of the metal band 55 are provided with apertures 56 for receiving the hooked ends 57 of a coil spring 58 for yieldingly urging the free ends of the metal band 55 toward one another and exerting a yielding radially inward force on the link chain rollers 40. One end of the flexible metal band 55 is provided with a bracket 59 having lugs or ears 60 at each end thereof which are apertured for receiving a pin 61 (see Fig. 4). The pin 61 is adapted to receive the inner links 35 and spacing members 63 are mounted on the pin 61 to hold the inner link members 35 in side by side spaced-apart relation.

Thus it will be seen that the leading end of the link chain 35—36 is connected to the flexible metal band 55, while the trailing end of the roller link chain is anchored to the internal clutch member 7 between the radial channel walls 20.

Riveted to the outer side of the flexible metal band 55 at circumferentially spaced-apart locations is a composition clutch lining 65 which is formed of friction material adapted to resist high heat such as asbestos composition. Rivets 66 are provided for securing the friction clutch lining 65 to the flexible metal band 55 so that the same will be carried thereby in a unitary structure.

In operation, it will be assumed that the motor 10 is to be rotated in a direction to rotate the internal clutch member 7 in the direction of the arrow G (see Fig. 1), that is, counterclockwise. With the motor at rest, the roller link chain actuator assumes the position illustrated by the radial line and arrow D (see Fig. 3), by reason of the compressive force exerted on the rollers 40 by the contraction of the flexible metal band 55 under the influence of the coil spring 58. When the motor 5 is started, the internal clutch member 7 will be rotated in a counterclockwise direction which will cause the roller link chain 35—36 to expand circumferentially by the inertia force created from the centrifugal action.

As the roller link chain tends to assume a position of increased diameter under the influence of the centrifugal action, a corresponding force is exerted outwardly and radially on the flexible metal band 55 and friction clutch element 65 sufficient to cause the friction clutch element 65 to frictionally engage the inner peripheral surface of the clutch drum 33 of the external clutch member 8. This action will cause the roller link chain to back up or further buckle in the annular channel of the internal clutch member 7, and the inner and outer links 35 and 36 of the roller link chain will then assume the E position shown by the radial line and arrow (see Fig. 3), such as to exert an additional radial force outward against the flexible metal band 55 and friction clutch element 65. It will thus be seen that the spaced-apart rollers 40 of the roller link chain will exert such an additional force as to establish a self-energizing action, and that the rollers 40 will engage the inner surface of the flexible metal band 55 with a greater force depending upon the load applied to the external clutch member.

It is to be understood that alternate inner rollers 41 exert a corresponding force in an opposite sense upon the annular flanges 18 of the internal clutch member 7. Also, it is pointed out that the inner and outer links 35 and 36 of the roller link chain may toggle during their self-energizing action uniformly throughout their entire length. That is to say, that each set of inner and outer chain links 35–36 will toggle within the limits of the slots 46 of the limit links 44 so that after one set of links 35–36 assumes a predetermined angular position, the next adjacent sets of links 35–36 will assume a corresponding position in succession.

When the speed of the motor 5 is reduced to a predetermined R. P. M. the rotational speed of the clutch assembly decreases and the flexible metal band 55 will urge the rollers 40 radially inwardly due to decreased centrifugal force and contraction of spring 58, so that the link pins 37 of certain chain links will be limited in their movement away from one another as shown in the D position (see Fig. 3). Thus, when one set of links 35–36 have collapsed a distance controlled by the limit links 44, the next adjacent set of links will collapse, and the collapsing movement will be uniform throughout the entire circumferential extent of the roller link chain actuator.

It is to be understood that the form of invention herewith shown and described is to be taken as a preferred embodiment thereof and that various changes in the shape, size and arrangement of parts may be resorted to without departing from the spirit of the invention or the scope of the subjoined claims.

What I claim is:

1. In an automatic speed responsive clutch, internal and external clutch members, a flexible clutch band mounted between said members, a link chain actuator including link connecting pins and having alternate links extending in substantially the same generally tangential direction, means connecting one end of the actuator to the internal clutch member, means connecting the opposite end of the actuator to the friction clutch band, and means for holding alternate link pins of said actuator against movement beyond predetermined limits.

2. In an automatic speed responsive clutch, internal and external clutch members, a friction clutch band mounted between said members, a link chain actuator including link connecting pins and having its one end connected to the internal clutch member and its opposite end connected to the clutch band, and limit links connecting alternate link pins of said link chain actuator.

3. In an automatic speed responsive clutch, inner and outer clutch members, a clutch band mounted between said members, a link chain actuator including link connecting pins having its one end connected to the inner clutch member and its opposite end connected to one end of said clutch band, and limit links having a slotted connection mounted on alternate link pins of said chain actuator.

4. In an automatic speed responsive clutch, internal and external clutch members mounted for relative rotation, a flexible clutch band mounted between said clutch members and an articulated link chain disposed circumferentially with relation to said internal clutch member having its one end connected to the internal clutch member and the opposite end connected to the clutch band with its alternate links buckled to extend in substantially the same generally tangential direction.

5. In an automatic speed responsive clutch, internal and external clutch members, a friction clutch band mounted between said members, yielding means connecting the ends of said clutch band and a link chain actuator having one end connected to the internal clutch member and its leading end connected to said clutch band, alternate links of said chain actuator being arranged to extend in substantially the same generally tangential direction so that the ends thereof will exert a radial outward force at substantially equidistantly spaced locations against the inner periphery of said clutch band.

6. In an automatic speed responsive clutch, internal and external clutch members arranged for relative rotation, a flexible clutch band mounted between said members and yieldingly urged in a direction radially inward, a link chain actuator including link connecting pins, said actuator extending between said clutch members with its one end connected to said inner clutch member and its opposite end connected to said clutch band, said links being buckled so that alternate links extend substantially tangentially in the same direction, and limit links connecting alternate link pins of said chain actuator against movement beyond predetermined limits.

7. In an automatic speed responsive clutch, internal and external clutch members arranged concentrically and mounted for relative rotation, a friction clutch band mounted between said members having its ends yieldingly connected, a roller link chain actuator arranged between said internal clutch member and clutch band with its trailing end connected to said internal clutch member and its leading end connected to said clutch band, and limit links connecting adjacent link pins of said actuator to hold the same against movement within predetermined limits and to position alternate links of said actuator in substantially the same tangential direction.

8. In an automatic speed responsive clutch, internal and external clutch drums mounted concentrically for relative rotation, a friction clutch band mounted between said drums, yielding spring means for normally holding said clutch band contracted, a link chain actuator including link connecting pins, said actuator extending about said internal clutch member having its trailing end connected thereto and its leading end connected to said clutch band, said link chain actuator being arranged to exert a radial outward force on the clutch band when the internal clutch member is rotated at a predetermined speed, said link chain actuator being arranged with alternate links extending in substantially the same tangential direction, and limit links connecting inner alternate link pins to limit the movement of said pins circumferentially within predetermined distances.

9. In an automatic speed responsive clutch, internal and external clutch drums mounted for relative rotation, a friction clutch band mounted between said drums, a roller link chain actuator including link connecting pins, said actuator extending about the periphery of the internal clutch member with its trailing end connected thereto, and its opposite end connected to said clutch band, said link chain actuator being arranged with alternate links extending in substantially the same tangential direction with alternate rollers engaging the internal clutch drum and internal surface of said clutch band, and limit links connecting alternate link pins to hold said chain actuator in a uniformly buckled condition and to retain the alternate inner link pins against movement beyond predetermined limits.

10. In an automatic speed responsive clutch, internal and external clutch drums mounted concentrically for relative rotation, a friction clutch band mounted between said drums and yieldingly urged in a contracted position, a link roller chain actuator including link connecting pins, said actuator extending about the periphery of the internal clutch drum with its trailing end connected thereto and its leading end connected to said clutch band, said roller link chain being arranged with alternate links extending in substantially the same tangential direction with alternate rollers engaging the inner clutch drum and the inner periphery of the clutch band, and limit links connecting alternate link pins by a slotted connection therewith to permit movement of the inner link pins within predetermined limits.

11. In an automatic speed responsive clutch, internal and external clutch drums mounted concentrically for relative rotation, a friction clutch band mounted between said drums adapted to engage the outer clutch drum, an articulated roller link centrifugal clutch actuator including link connecting pins, said actuator extending about the periphery of the inner clutch drum with its trailing end connected thereto and its opposite end connected to said clutch band, said clutch actuator being buckled with alternate links extending substantially in the same tangential direction so that alternate rollers will engage the outer peripheral surface of the internal clutch drum and the inner peripheral surface of said clutch band, and limit links connecting alternate link pins to hold the same against movement beyond predetermined limits.

12. In an automatic speed responsive clutch, internal and external clutch drums, a friction clutch band mounted between said drums and engageable with the inner periphery of the outer drum, yieldable means for holding said clutch band in a contracted position, an articulated roller link chain centrifugal actuator including link connecting pins, said actuator extending about the outer periphery of the internal clutch drum with one end connected thereto and its leading end connected to said clutch band, said roller link chain being buckled with alternate links extending in substantially the same tangential direction and alternate rollers engaging the outer peripheral surface of the internal drum and inner peripheral surface of said clutch band, and limit links connecting alternate sets of inner link pins to limit movement of said pins beyond predetermined limits in both circumferential directions.

13. In a speed responsive clutch, an internal and an external clutch member arranged concentrically, actuating means for drivingly connecting said internal clutch member with said external clutch member comprising a segmental chain positioned circumferentially with relation to said internal clutch member, said chain having consecutive pairs of directly connected links thereof connected by limit links with the two links of a pair extending at an angle with respect to each other.

14. In a speed responsive clutch, an internal clutch member, an external clutch member concentrically disposed with respect to said internal clutch member, a link chain actuator secured at one end to said internal clutch member and loosely disposed circumferentially with relation thereto, means associated with said chain for establishing a driving engagement between said internal and external clutch members upon radial outward movement of said chain, means applying a predetermined, radially inwardly directed force to said chain, and limit links joining the inner ends of consecutive pairs of connected links of said chain to maintain the links of a pair extending at an angle with respect to each other.

15. In a speed responsive clutch, an internal and an external clutch member arranged concentrically, actuating means for drivingly connecting said internal clutch member with said external clutch member comprising a chain disposed circumferentially with relation to said internal clutch member, limit links joining pairs of connected links of said chain whereby the two links of a pair extend at an angle with respect to each other, said limit links permitting buckling and straightening of said pairs of links in response to centrifugal force so that the angle is less when said clutch members are engaged than when said clutch members are disengaged.

16. In a speed responsive clutch, a driving member, a driven member adapted to be connected to said driving member and located radially outwardly of said driving member, and means for connecting said driving member to said driven member including a circumferentially disposed link chain interposed between said members and connected to said driving member, said chain having links in zig-zag relation buckling and movable radially in response to rotation by said driving member, and means limiting adjacent pairs of elements of said chain in their movement with respect to each other, whereby uniform disengagement of said clutch is facilitated.

17. In an automatic speed responsive clutch, internal and external clutch members, a link chain actuator including link connecting pins and having alternate links extending in substantially the same generally tangential direction, means connecting one end of the actuator to the internal clutch member, and means for holding alternate link pins of said actuator against movement beyond predetermined limits.

18. In an automatic speed responsive clutch, internal and external clutch members, a link chain actuator mounted between said members and having one end connected to the internal clutch member, alternate links of said chain actuator being connected to extend in substantially the same tangential direction so that the ends thereof will exert a radial outward force at substantially equidistantly spaced locations against the inner periphery of said external clutch member.

19. In an automatic speed responsive clutch, internal and external clutch members arranged concentrically and mounted for relative rotation, a link chain actuator arranged between said clutch members with its one end connected to said internal clutch member, and limit links positioning alternate links of said actuator in substantially the same tangential relation and holding the same against individual movement within predetermined limits.

20. In a speed responsive clutch, an internal and external clutch member arranged concentrically, a link chain actuator drivingly connecting said internal clutch member with said external clutch member at a predetermined speed disposed circumferentially relative to said internal member, said actuator being connected at one end to said internal clutch member and comprising a chain having consecutive pairs of links connected at an angle relative to one another in zig-zag relation, and means restraining the tendency of the pairs of links to straighten out when the speed of the internal member is decreased.

21. In a speed responsive clutch, internal and external clutch members arranged concentrically for relative rotation, a link chain actuator disposed circumferentially with relation to said internal clutch member connected at one end thereto, said actuator comprising connected link pairs with the links thereof connected at an angle relative to one another, and means for limiting the buckling of said pairs of links when the speed of said internal member is such that said actuator engages and drives said outer member and for limiting the straightening of said links when the speed of the internal member is such that the actuator is out of engagement with said outer member.

22. In a speed responsive clutch, internal and external clutch members mounted for relative rotation, a link chain actuator connected at one end to said internal clutch member and substantially encircling said internal clutch member for drivingly engaging said outer clutch member and causing rotation of the clutch members in unison, said actuator comprising connected link pairs with the links thereof connected at an angle relative to one another.

23. In a link chain actuator for joining relatively rotatable members when one of them attains a predetermined speed, connected link pairs with the links thereof disposed at an angle relative to one another, link pins pivotally joining the adjacent ends of said pairs of links, link pins joining the remote ends of the links with like ends of identical adjoining link pairs, the remote ends of the links of a link pair being unconnected and movable relatively one to another and limit links having a pin and slot connection with said first-mentioned link pins spanning said link pairs and limiting the buckling and straightening thereof.

24. In an automatic speed responsive clutch, an internal clutch member mounted to rotate in one direction, an external clutch member mounted for rotation in the same direction, a circumferentially disposed link chain actuator comprising buckling links in zig-zag relation for drivingly connecting said internal and external clutch members, said chain having a trailing end relative to the direction of rotation of said internal clutch member connected to said internal clutch member and a leading end movable circumferentially in both directions, and means to provide a uniform spreading action of said links throughout the length of said chain when the speed of said members has decreased such that the actuator no longer drivingly connects said members.

25. In an automatic speed responsive clutch, a driving clutch member mounted to rotate in one direction, a clutch member external thereto, a circumferentially disposed link chain actuator comprising links in zig-zag relation for drivingly connecting said driving and external clutch members when the driving clutch member has attained a predetermined speed of rotation, said chain having a trailer end relative to the direction of rotation of said driving clutch member connected to said driving clutch member and a leading end movable circumferentially in either direction.

26. In a link chain actuator for joining relatively rotatable members when one attains a predetermined speed, connected link pairs, each pair comprising links in zig zag disposition with the adjacent ends thereof pivotally connected, and the remote ends free of one another, and means connected to said link pairs limiting the buckling and straightening of said links while permitting limited lengthwise reduction and expansion of the overall length of said actuator during buckling and straightening respectively.

References Cited in the file of this patent

UNITED STATES PATENTS

| | | |
|---|---|---|
| 124,042 | Edwards | Feb. 27, 1872 |
| 1,557,368 | Kershaw et al. | Oct. 13, 1925 |
| 1,856,135 | Nieman | May 3, 1932 |
| 1,887,467 | Renshaw | Nov. 8, 1932 |
| 2,010,885 | Osterholm | Aug. 13, 1935 |
| 2,021,921 | Osterholm | Nov. 26, 1935 |
| 2,035,242 | McCann | Mar. 24, 1936 |
| 2,087,488 | Stanley | July 20, 1937 |
| 2,386,071 | Stephenson | Oct. 2, 1945 |
| 2,513,798 | Hatfield | July 4, 1950 |

FOREIGN PATENTS

| | | |
|---|---|---|
| 121,981 | Great Britain | Jan. 3, 1919 |
| 439,424 | France | Apr. 6, 1912 |